United States Patent [19]

Janata et al.

[11] 4,023,855
[45] May 17, 1977

[54] GLARE SHIELD

[76] Inventors: Shirleen J. Janata; Thomas A. Janata, both of 835 Ayers Lane, Galt, Calif. 95632

[22] Filed: Nov. 24, 1975

[21] Appl. No.: 634,930

[52] U.S. Cl. .............................................. 296/97 C
[51] Int. Cl.² ............................................ B60J 3/00
[58] Field of Search ............. 296/97 C, 97 D, 97 R, 296/97 B, 97 A

[56] References Cited

UNITED STATES PATENTS

| | | | |
|---|---|---|---|
| 2,802,693 | 8/1957 | Lauve | 296/97 D |
| 3,325,209 | 6/1967 | Weingarten | 296/97 R |
| 3,430,299 | 3/1969 | Copen | 296/97 C X |
| 3,679,255 | 7/1972 | Nacarato | 296/97 C |
| 3,837,703 | 9/1974 | Holladay | 296/97 C |
| 3,853,370 | 12/1974 | Barnhart | 296/97 C |
| 3,940,180 | 2/1976 | Altschul | 296/97 D |

*Primary Examiner*—Joseph F. Peters, Jr.
*Assistant Examiner*—Milton L. Smith
*Attorney, Agent, or Firm*—Dominick Nardelli

[57] ABSTRACT

A glare shield assembly for use in combination with an auto sun visor, wherein a light filtering shield has means for attaching it to the sun visor to allow the shield to be moved up and down, sideways and pivotable, about a vertical as well as about an horizontal axis, with respect to the sun visor. In the preferred embodiment, the attaching means is comprised of pressure sensitive readily releasable engaging means having mating interengaging elements mounted on the sun visor and glare shield. To allow the visor and shield to pivot with respect to each other, the glare shield has its pressure sensitive readily releasable engaging means wrapped 180° about a vertical edge and also about a horizontal edge thereof.

4 Claims, 6 Drawing Figures

U.S. Patent May 17, 1977 4,023,855
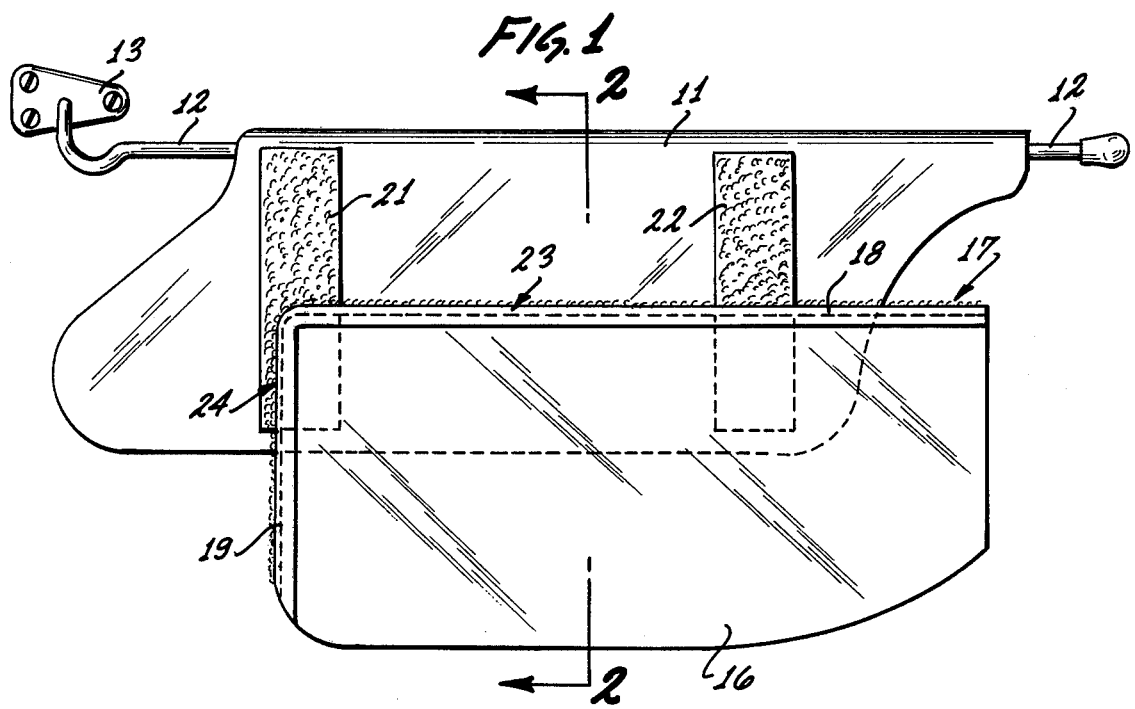
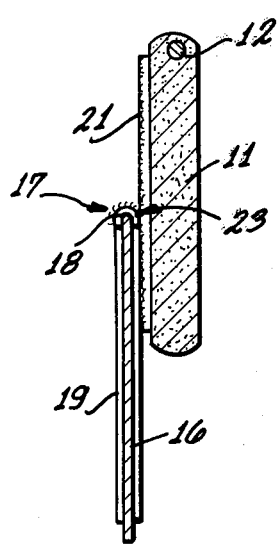 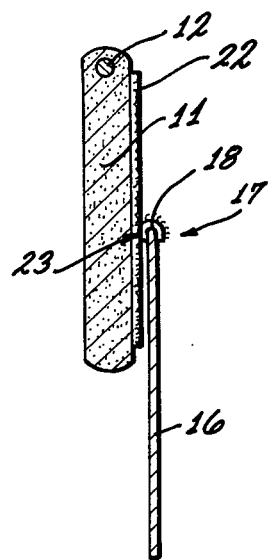 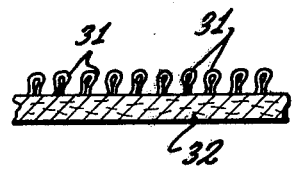
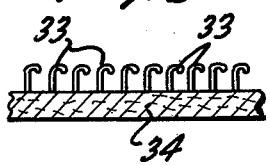
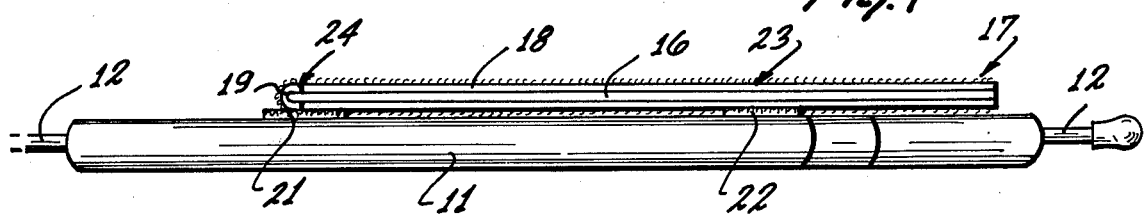

GLARE SHIELD

FIELD OF THE INVENTION

This invention relates to a sun visor extension for use with the main sun visor which is conventionally installed in vehicles, such as automobiles and trucks and, more particularly, to such sun visor extension which is moveable in a plane parallel to the main visor and which is also rotatable with respect to the main visor.

BACKGROUND OF THE INVENTION

As every motorist knows, sun visors are placed in automobiles to shield the sun from the driver's eyes whenever he is driving into the sun, and also when the sun is to the left of him. Because the driver must see where he is going, the position of the lower edge of the sun visor is predetermined. However, when the sun is at a low angle, the sun visor is not effective. This condition is not as dangerous as when he is ascending a hill, because now the actual earth azimuth angle of the sun is relatively large and its rays are bright, but the angle the sun makes with respect to the vehicle is much smaller to allow the bright rays to shine into the driver's eyes, as the sun visor inherently cannot shield them.

In the past, various means have been employed to further block out sun rays from the driver's eyes. For example, U.S. Pat. No. 3,853,370 teaches a means for holding a transparent glare shield onto the sun visor, which allows one to pull down the glare shield against the action of the spring. U.S. Pat. No. 3,837,703 teaches a means which allows one to rotate a glare shield downward. Although these prior art devices help to alleviate the dangerous effects of the sun rays, they are complicated and have limited utility.

OBJECTS OF THE INVENTION

An object of this invention is to provide a means for mounting a glare shield onto the sun visor, which means are simple, economical and more versatile.

Another object of this invention is to provide a means to allow one to use a glare shield with a sun visor, so that the glare shield can be rotated to the side window, while the sun visor is against the windshield.

Another object of this invention is to provide a means which allows one to move a glare shield sideways as well as rotate it with respect to the sun visor.

These and other objects and features of advantage will become more apparent after studying the preferred embodiment of our invention, together with the appended claims.

BRIEF DESCRIPTION OF THE DRAWING

FIG. 1 is a face view of a vehicle sun visor, in a turned down position, with a glare shield mounted on the side facing the driver.

FIG. 2 is a section taken on line 2—2 of FIG. 1, in the direction of the arrows.

FIG. 3 is another section taken on line 2—2, but in the opposite direction of the arrows.

FIG. 4 is a bottom view of the combination of FIG. 1.

FIG. 5 is an enlarged cross-section of the first type of pressure sensitive readily releasable engaging means strip, consisting of closed loops.

FIG. 6 is an enlarged cross-section of a portion of the second type of pressure sensitive readily releasable engaging means strip, which consists of relatively rigid hooks.

DETAILED DESCRIPTION OF THE DRAWINGS

In FIG. 1 there is shown a main sun visor 11 which is illustrative of a conventional sun visor provided in vehicles such as automobiles and trucks. This visor 11 is mounted on a hinged rod 12 passing therethrough, which rod, in turn, is mounted on a standard bracket 13, which is suitably fastened to the overhead of the vehicle. In FIG. 1 the main visor 11 is shown in its turned down position to stop any sun rays from coming through the windshield (not shown) which would be on the far side of the visor 11. A glare shield 16 is mounted on the visor 11 by novel means 17, which allows one to move the shield 16 up, down and sideways in a plane parallel to the visor, to rotate the shield about a horizontal axis which coincides substantially with an upper edge 18 on the shield 16, and also to rotate the shield about a vertical axis which coincides substantially with a side edge 19 of the shield 16. Naturally, if the shield 18 is to be mounted on the passenger's side, the side edge would preferably be on the right instead of on the left, as viewed in the drawings.

The means 17 in the preferred embodiment consists of two pressure sensitive readily releasable engaging means first type strips 21 and 22, mounted transversely on the visor 11, as shown, and of a pressure sensitive readily releasable engaging means second type strip 23 folded over or wrapped around edge 18, as more clearly shown in FIGS. 2 and 3. Another pressure sensitive readily releasable engaging means strip 24 is folded over or wrapped around edge 19, as more clearly shown in FIG. 4. The pressure sensitive readily releasable engaging means strips are standard items wherein the first type pressure sensitive readily releasable engaging means strip is shown enlarged in FIG. 5 and consists of a plurality of many closed loops 31 bonded onto a flexible strip 32. The second type pressure sensitive readily releasable engaging means strip is more clearly shown enlarged in FIG. 6 and consists of a plurality of J-type hooks 33, fastened to a suitable flexible strip 34. One understands, for convenience in this application, the first type pressure sensitive readily releasable engaging means strips are referred to as the closed hoops and the second type pressure sensitive readily releasable engaging means strips are referred to as hooks, but one can easily transpose one type for the other, as is well known in the art. The backing strips 32 and 34 of the pressure sensitive readily releasable engaging means strips are conveniently made with an adhesive which can stick on most surfaces. As everyone knows, the pressure sensitive readily releasable engaging means strips have an inherent property, i.e., when one type is pressed onto the other type, the hooks in one type engage the closed loops in the other type and do not become readily separated. To separate the two strips, one must preferably start by pulling from one end and separate them by peeling motions. Since the pressure sensitive readily releasable engaging means strips have adhesive backing thereon, they can be readily applied to the sun visor and to the glare shield, as required.

One can see, as the shield 16 is raised to rotate about edge 18, some of the hooks in the shield 16 will be forced to let go the respective loops on the sun visor 11, and other hooks will engage more loops. The same is true when the shield 16 is rotated about edge 19. If one wants to drop the shield 16 or raise it while still parallel to the sun visor 11, one need only pull one end, thereby disengaging the shield from the visor and shift the shield and press the strips together. Since the shield is transparent, made of plastic, it is relatively light, and the strips would hold it in its rotated raised position. However, due to the greater lever action when the shield is rotated about the vertical axis, the engaging strips 21 and 24 may not hold the weight. Then one could place another strip (not shown) over the side window so that the hook portion strip 23 on the top end 18 may engage it.

Having described the preferred embodiment of our invention, one skilled in the art, after studying the above teachings, can devise other embodiments without departing from the spirit and intentions of our invention. Therefore, our invention is not to be considered limited to the disclosed embodiment, but includes all embodiments falling within the scope of the appended claims.

We claim:

1. A glare shield device for an operator of a motor vehicle having a windshield and a side window, said device comprising:
    a sun visor mountable behind the windshield of said motor vehicle and having upper and lower edges and opposite side edges;
    a glare shield having an upper and lower edge and opposite side edges;
    a first type of pressure sensitive readily releasable engaging means strip affixed to one side of said visor;
    a second type of pressure sensitive readily releasable engaging means strip affixed to said shield;
    said second type strip being affixed in a wrap-around folded relationship over one of said edges of said shield.

2. The device of claim 1 wherein:
    said first type strip is a pair, and spaced apart on one side of said visor;
    said second type of strip is affixed to the upper edge of said shield; and
    another second type of pressure sensitive readily releasable engaging means strip is affixed to one of said side edges of said shield, also in a wrap-around folded relationship.

3. The device of claim 2 wherein:
    said upper and side edges of said shield, with said pressure sensitive readily releasable engaging means strips are disposed substantially perpendicular to each other.

4. The device of claim 3 wherein said pair of first type strips are disposed parallel, and substantially perpendicular to the upper and lower edges of said visor.

* * * * *